METHOD FOR ERASING A THERMOPLASTIC RECORD

Filed Dec. 31, 1962 2 Sheets-Sheet 1

INVENTORS
ROBERT J. BROWN
JOHN F. SCHOMBURG
BY
Bernard N. Wiener
ATTORNEY

April 5, 1966 R. J. BROWN ET AL 3,245,053

METHOD FOR ERASING A THERMOPLASTIC RECORD

Filed Dec. 31, 1962 2 Sheets-Sheet 2

United States Patent Office 3,245,053

Patented Apr. 5, 1966

3,245,053

METHOD FOR ERASING A THERMOPLASTIC RECORD

Robert J. Brown, Yorktown Heights, and John F. Schomburg, Stony Point, N.Y., assignors to International Business Machines Corporation, New York, N.Y., a corporation of New York Filed Dec. 31, 1962, Ser. No. 248,737
8 Claims. (Cl. 340—173)

This invention relates generally to a method for erasing information stored as deformations in a thermoplastic record surface, and it relates particularly to a method for erasing a region of such deformations.

In the art of thermoplastic recording, an electrostatic charge distribution representative of an information pattern is established on the surface of a thermoplastic record. The surface is then softened and a ripple pattern of deformations representative of the charge distribution is established in the surface. One technique for establishing the charge distribution utilizes a corona discharge and is described in patent application S.N. 84,570, now Patent No. 3,055,006, filed January 21, 1961 by Alex W. Dreyfoos, Jr., et al. and assigned to the assignee hereof. Another technique for establishing the charge distribution utilizes an electron beam and is described in an article by W. E. Glenn published in the Journal of Applied Physics, vol. 30, December 1959, pp. 1870–1873. The softening of the surface of the thermoplastic material may be accomplished by heating the material until it becomes suitably viscous. In such a softening technique there must be two heat levels for information handling with a thermoplastic record with respect to the normal temperature at which the record is too viscous to deform under the applied electrostatic pressure. Information handling with a thermoplastic record implies that information is both written in and erased from the record. A cycle or reversal implies writing of an information pattern and its erasure. The first heat level is one at which deformations are established in the record and the second heat level is one at which the deformations are erased from the record.

In the prior art, it has been a necessary disadvantage to have to elevate the temperature of the thermoplastic record surface to a relatively high temperature with respect to the writing temperature in order to erase the information stored therein. Since the cycling or reversibility quality of a material is impaired in a direct relationship to the temperature and time thereat, the usefulness of a particular record is diminished significantly by any elevation to a higher temperature. It is important in many information storage systems that a particular record be written and erased an indefinite number of times.

It is well known that the organic chemical reaction rate double with approximately every 10° C. rise in temperature. Chemical reactions usually occur due to oxidation when a thermoplastic is exposed to air. In addition, chemical reaction may occur between constituent components within the thermoplastic material itself. In any event, it is well known that any temperature rise is undesirable for long time usefulness of a thermoplastic record.

A further disadvantage of the prior art technique of softening the surface of the thermoplastic record for erasing information has been the requirement for a temperature considerably above that required for the writing step. This has required in some instances a more complicated heating technique than would have been required if the heat level for erasing were substantially that utilized for the writing.

Further, it is often desirable to be able to erase a selected region of information of a thermoplastic record. In the prior art this has been difficult to achieve because of the difficulty of heating the region sufficiently without also heating adjacent regions to such a level that they too erase.

It is the primary object of this invention to provide a method for erasing a thermoplastic record.

It is a second object of this invention to provide a method for selectively erasing a region of information in a thermoplastic record.

It is a third object of this invention to provide a method for erasing a thermoplastic record without a requirement for excessive heat.

It is a fourth object of this invention to provide a method for increasing the number of times a thermoplastic record can be cycled.

It is a fifth object of this invention to provide a method for removing controllably information stored in a thermoplastic record.

It is a sixth object of this invention to provide a method for information handling with a thermoplastic record.

One advantage of this invention is that the number of possible cycles of a thermoplastic record is increased by the practice thereof. A second advantage of this invention is that the temperature required for erasure of a thermoplastic record is lessened by the practice thereof. A third advantage of this invention is that a selected region of a thermoplastic record can be controllably erased.

The foregoing and other objects, features and advantages of this invention will be apparent from the following more particular description of a preferred embodiment of the invention, as illustrated in the accompanying drawings.

It has been discovered herefor that a distribution of electrostatic charge on a region of a thermoplastic record permits erasure thereof at a decreased temperature with respect to the requisite prior art temperature. This invention involves the practice of this discovery. A method is provided by this invention for erasure of information stored as a pattern of deformations in a thermoplastic record surface. In the practice thereof a charge distribution is established on a region of the record which is concomitantly softened, as by heating. Usually, in the prior art of thermoplastic recording, the softening occurs subsequent to the distribution of charge in accordance with the information pattern. However, this is not a requirement for the practice of this invention. It has been determined by the discovery herefor that the heat required to erase the record region is significantly less than that required without the charge disribution.

Figure 1:
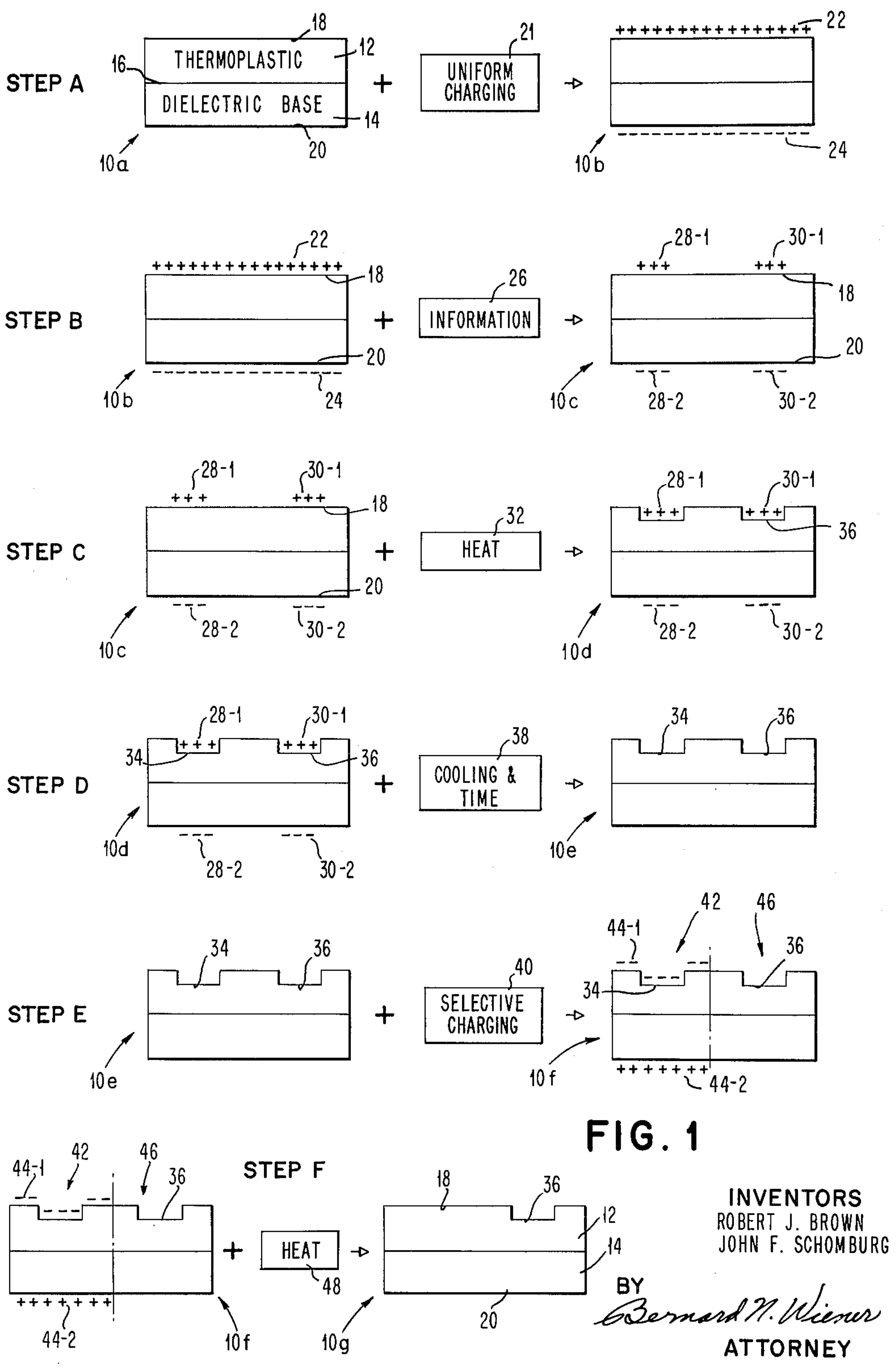
FIGURE 1 illustrates the nature of the prior art technique of information handling with a thermoplastic record and the practice of this invention.

A method of information handling with a thermoplastic record utilizing the practice of this invention will be described with reference to FIG. 1. In FIG. 1, step A, a thermoplastic sandwich 10$a$ comprises a thermoplastic layer 12 bonded to a dielectric base 14 at surface 16. Thermoplastic layer 12 has surface 18 and dielectric base layer 14 has surface 20. A uniform charging 21 of the surface 18 of the thermoplastic layer 12 with a positive electrostatic charge 22 and the dielectric base surface 20 with a negative electrostatic charge 24 provides sandwich 10$b$.

In step B, the sandwich 10$b$ provided by step A is exposed to information 26 which causes a redistribution of the charge pattern on sandwich 10$b$ representative of the information 26 to provide sandwich 10$c$. The sandwich 10$c$ has positive charge distribution 28–1 and negative charge distribution 28–2 representative of one item of information, and positive charge distribution 30–1 and negative charge distribution 30–2 representative of another item of information.

The thermoplastic-dielectric base sandwich illustrated in FIG. 1 is shown as a two-dimensional cross-section representation with the surfaces thereof being one-dimensional. It will be understood that the illustrated linear disposition of charge on the surfaces thereof will actually be an areal disposition.

The nature of charge pattern couples 28–1 and 28–2; and 30–1 and 30–2 are such that positive charge pattern 28–1 and negative charge pattern 28–2 attract each other and positive charge pattern attract each other; and positive charge pattern 30–1 and negative charge pattern 30–2, attract each other. The distributions are such that the other attractions and repulsions are of minor significance. The attraction establishes a pressure tending to compress the surface 18 of the thermoplastic layer 12 toward the surface 22 of the dielectric base layer 14 at the locations of the charge couples. However, since these surfaces are effectively solid, no deformation thereof occurs.

In step C, the charge couples cause deformations of the thermoplastic layer surface 18 as a result of the addition of heat 32. The heat is insufficient to make the dielectric base layer pliable enough to deform under the charge couple pressure. The heat is sufficient to permit the pressure resultant from the charge couples to establish a deformation pattern in the surface of the thermoplastic layer. A deformation 34 is established in the location of positive charge distribution 28–1 and a deformation 36 is established in the location of positive charge distribution 30–1.

In step D, as a consequence of cooling and time 38, the deformations 34 and 36 become permanenty established within sandwich 10$f$. Although the deformations 34 and 36 are stable without the requirement of step D, the cooling and time 38 provides the sandwich 10$e$ in a condition for ease of handling physically.

Steps E and F illustrate the practice of the erasure aspect of this invention. In step E by selective charging 40 of region 42 of thermoplastic surface 18, a negative charge distribution 44–1 is obtained thereover. A comparable positive charge distribution 44–2 is established on the dielectric base 14 surface 20. The adjacent region 46 is not selectively charged as it is desired to leave the deformation 36 unchanged. It has been determined for the practice of this invention that utilization of opposite charge to that utilized for writing in step B causes a greater diminution in requisite temperature for erasure than does the utilization of the same sign charge. However, the practice of this invention contemplates utilization of either sign charge dependent upon particular operational conditions.

In step F, the sandwich in the condition 10$g$ provided by step E is subjected to heat 48 which causes an erasure of the deformation pattern 34 and leaves unaffected the deformation pattern 36. The temperature for the erasure is significantly less than would have been required if the charge distributions 44–1 and 44–2 had not been utilized.

Figure 2:
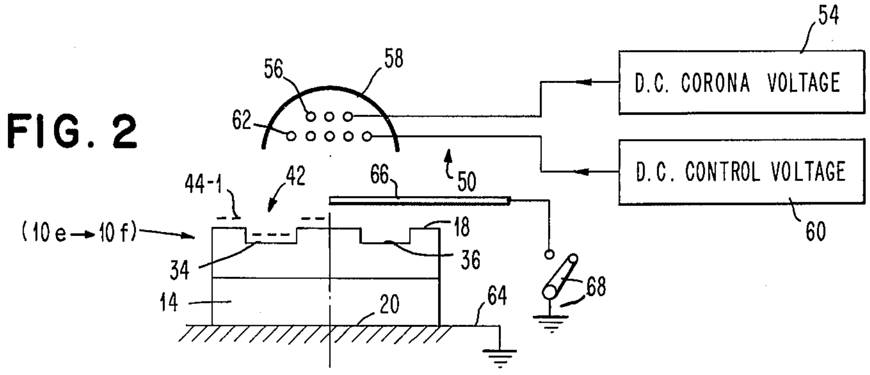
FIGURE 2 illustrates a charging technique utilizing corona discharge for establishing a charge on a selected region of a thermoplastic record.
Figure 3:
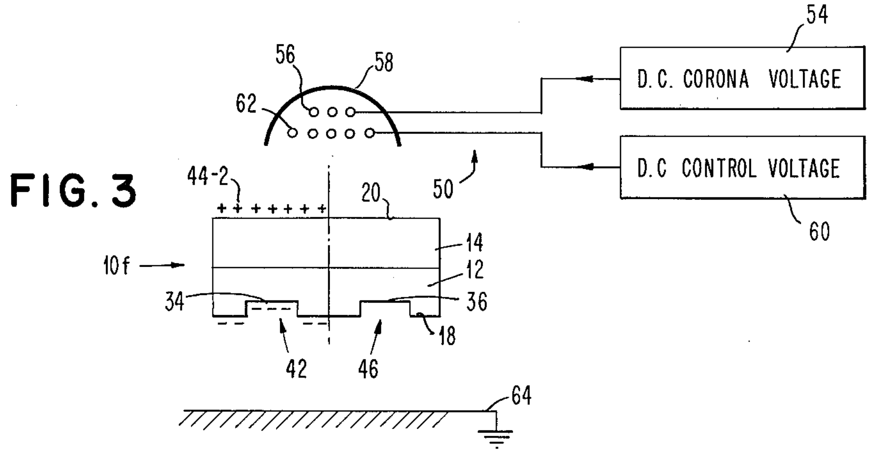
FIGURE 3 illustrates the establishment of an opposite sign charge distribution on the dielectric base side of the thermoplastic record sandwich to the sign charge utilized in FIGURE 2.

A suitable technique for establishing the charge distribution utilized for the practice of this invention in steps E and F is illustrated by FIGS. 2 and 3. With reference to FIG. 2, a negative charge distribution 44–1 is established on area 42 by corona discharge device 50. Corona discharge device 50 comprises a high D.C. corona voltage source 54, in practice often of the order of 6000 volts, connected to a high voltage electrode 56 disposed within insulator housing 58. D.C. control voltage source 60, in practice often of the order of 1200 volts, is connected to control grid structure 62 disposed between high voltage electrode 56 and surface 18 of thermoplastic sandwich 10$f$. The thermoplastic sandwich 10$e$ is positioned with its dielectric base 20 proximate to ground surface 64. Disposed between control grid 62 and the surface of the thermoplastic layer 12 is a metallic foil 66 which shields the surface of the thermoplastic layer 18 where it is not desired to establish a charge pattern. A switch 68 is shown connected between foil 66 and ground 64. After the charge pattern is distributed on surface 10, the switch 68 is closed to discharge the foil.

In FIG. 3, the dielectric base of the sandwich 10$g$ is shown as having been removed from ground and exposed to the corona discharge device 50. The height to which the sandwich should be raised is readily determined by experiment. The width of the gap between the sandwich and ground is not critical. While the metal foil 66 may also be disposed between the dielectric base 14 surface 20 and the corona discharge device 50, it is not necessary that it be so for the carrying out of the step shown in FIG. 3. As illustrated in FIG. 3, the opposite sign charge is established on the surface 20 to that established on surface 18. For this purpose, the polarities of the corona voltage 54 and control voltage 60 must be appropriately changed.

Figure 4:
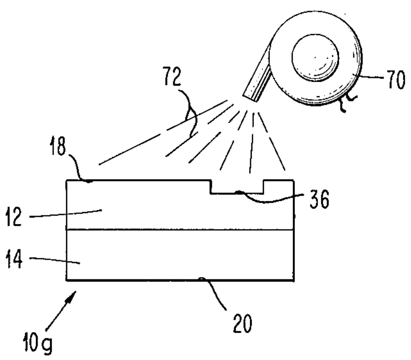
FIGURE 4 illustrates a technique for heating the thermoplastic record surface for erasure of a selected region of information theerof in the practice of this invention.

In FIG. 4, a heat source 70 is disposed proximate to thermoplastic layer surface 18. Heat source 70 provides a stream of warm air 72 for heating thermoplastic layer 14. Even though the hot air heats the deformation pattern 36 to the same temperature as deformation pattern 34, the pattern 36 is unaffected thereby and the consequence is the erasure of deformation pattern 34 from thermoplastic record surface 18.

EXPERIMENTAL RESULTS

The following are illustrative experimental results indicating the significant diminuation in heat required for erasing of thermoplastic records by the practice of this invention.

| Material | Temperatures, ° C. | | | |
|---|---|---|---|---|
| | $T_1$ | $T_2$ | $T_3$ | $T_4$ |
| Vinyltoluenebutadiene | 150 | 210 | 150 | 190 |
| Polystyrene ortho-terphenyl | 100 | 200 | 150 | 190 |

where:

$T_1$=temperature for writing information deformations.

$T_2$=temperature of erasure by prior art technique.

$T_3$=temperature of erasure by the practice of this invention utilizing charge of opposite sign as for writing.

$T_4$=temperature of erasure by the practice of this invention utilizing charge of same sign as for writing.

CONCLUSION

Various modifications of the practice of this invention will be apparent to those skilled in the art. Illustratively, the means for developing a charge distribution on the surface of a thermoplastic sandwich may be an electron beam if the charging takes place in a vacuum chamber. The foil 66 (FIG. 2) utilized for masking a region of a thermoplastic record can have various shapes and forms. It can be a grid structure whose potential is controlled thereby establishing various charge distributions on the surface of the thermoplastic layer 18. The heating of the sandwich **10*f*** can also be accomplished by radiant heating, by induction heating, and by resistance heating.

While the surface 18 of the thermoplastic layer 14 is shown to be flat, it can for some applications be the surface of a selected volume. Illustratively, it can be the surface of a sphere or the surface of a cylinder. The practice of the invention has been described for a sandwich of a thermoplastic layer and a dielectric base. However, in many applications, a thermoplastic layer alone is adequate dependent on operational conditions, e.g., the amount of physical handling of the thermoplastic record which is involved.

The D.C. control voltage 60 (FIGS. 2 and 3) can be modulated in accordance with a particular charge distribution required for surface 18 of thermoplastic layer 12 in steps E and F.

In step B of FIG. 1, the deformations 34 and 36 have been shown as being regular. For some applications, it is desirable that the deformations themselves have deformations in order that there be definition within an information pattern. Further, the charge distributions have been shown to be uniform and the deformations rectangular in shape. This is merely illustrative. In actual practice, if there is a uniform charge distribution in a particular areal region of the thermoplastic surface 18, the deformations have the appearance of a valley and material will appear as hills around the periphery thereof.

While the invention has been particularly shown and described with reference to a preferred embodiment thereof, it will be understood by those skilled in the art that various changes in form and details may be made therein without departing from the spirit and scope of the invention.

What is claimed is:

1. Method for establishing a uniform deformation pattern in a thermoplastic record of such nature that a given temperature of heating said record normally is required for erasing a pattern, said record having both deformed areas and non-deformed areas therein, comprising the steps of:

(a) distributing a charge pattern uniformly on a region of said record including both the deformed areas and the non-deformed areas therein, and (b) heating said region at a temperature lower than said given temperature to establish said uniform deformation pattern therein.

2. The method of claim 1 in which the sign of said charge pattern is opposite to the sign of the charge originally used to establish said deformed areas in said record.

3. Method for establishing controllably a uniform deformation pattern in a thermoplastic record surface of such nature that a given temperature of heating said record normally is required for erasing a pattern, said record having both deformed areas and non-deformed areas therein, comprising the steps of:

(a) disposing a charge distribution uniformly on a first region of said surface including both the deformed areas and non-deformed areas therein, and (b) heating a second region of said surface at a temperature lower than said given temperature to establish said uniform pattern therein, said second region being a part of said first region.

4. Method for establishing controllably a uniform deformation pattern in a thermoplastic record surface of such nature that a given temperature of heating said record normally is required for erasing a pattern, said record having both deformed areas and non-deformed areas therein, comprising the steps of:

(a) charging uniformly a first region of said surface including both the deformed areas and non-deformed areas therein, and (b) heating a second region of said surface to establish a uniform deformation pattern in said first region, said first region being a part of said second region.

5. Method for establishing a uniform deformation pattern in a thermoplastic record using a deformation pattern therein having both deformed areas and non-deformed areas therein and being of such nature that a given temperature of heating said record normally is required for erasing a latter pattern, comprising the steps of:

(a) charging firstly said thermoplastic record surface, said surface being in an initial condition in accordance with information to be stored therein, (b) heating said thermoplastic record surface at one temperature to establish said latter deformation pattern therein representative of said information, (c) charging secondly said surface uniformly in a first region thereof, including both the deformed areas and non-deformed areas therein, and (d) heating a second region of said surface at another temperature lower than said given temperature, said regions overlapping each other, to re-establish said initial condition in said overlapping region.

6. The method of claim 5 wherein said first region comprises a part only of said second region.

7. The method of claim 5 wherein said second region comprises a part only of said first region.

8. The method of claim 5 wherein said second charging is with a charge having sign opposite to the charge of said first charging.

References Cited by the Examiner

UNITED STATES PATENTS 2,985,866 5/1961 Norton -------------- 340—173

IRVING L. SRAGOW, *Primary Examiner.*